(12) United States Patent
Farmer (10) Patent No.: US 8,641,241 B2
(45) Date of Patent: Feb. 4, 2014

(54) GIMBALED LED ARRAY MODULE

(75) Inventor: Todd Farmer, Livermore, CA (US)

(73) Assignee: Bridgelux, Inc., Livermore, CA (US)

( * ) Notice: Subject to any disclaimer, the term of this patent is extended or adjusted under 35 U.S.C. 154(b) by 232 days.

(21) Appl. No.: 13/085,917

(22) Filed: Apr. 13, 2011

(65) Prior Publication Data

US 2012/0147604 A1 Jun. 14, 2012

Related U.S. Application Data

(60) Provisional application No. 61/423,016, filed on Dec. 14, 2010, provisional application No. 61/423,022, filed on Dec. 14, 2010.

(51) Int. Cl.
*B60Q 3/00* (2006.01)

(52) U.S. Cl.
USPC ............................ 362/368; 362/372; 362/404

(58) Field of Classification Search
USPC .................. 362/147, 362, 368, 372, 404, 426
See application file for complete search history.

(56) References Cited

U.S. PATENT DOCUMENTS

| | | | | |
|---|---|---|---|---|
| 4,392,187 | A * | 7/1983 | Bornhorst | 362/233 |
| 6,036,337 | A * | 3/2000 | Belfer | 362/287 |
| 6,170,965 | B1 * | 1/2001 | Kotovsky | 362/371 |
| 6,234,644 | B1 * | 5/2001 | Kotovsky et al. | 362/148 |
| 6,511,208 | B1 * | 1/2003 | Kotovsky | 362/285 |
| 6,568,826 | B1 * | 5/2003 | Kotovsky | 362/147 |
| 6,634,764 | B2 * | 10/2003 | Kotovsky et al. | 362/148 |
| 6,692,139 | B2 * | 2/2004 | Kotovsky | 362/368 |
| 6,896,391 | B2 * | 5/2005 | Kotovsky et al. | 362/145 |
| 6,969,182 | B2 * | 11/2005 | Kotovsky | 362/368 |
| 6,997,574 | B2 * | 2/2006 | Kotovsky | 362/147 |
| 7,036,953 | B2 * | 5/2006 | Kotovsky | 362/147 |
| 7,274,302 | B2 | 9/2007 | Stevenson et al. | |
| 7,500,776 | B1 | 3/2009 | Buczko | |
| 7,722,227 | B2 * | 5/2010 | Zhang et al. | 362/364 |
| 8,182,116 | B2 * | 5/2012 | Zhang et al. | 362/294 |
| 8,210,720 | B2 * | 7/2012 | Kotovsky et al. | 362/282 |
| 2003/0086258 | A1 * | 5/2003 | Kotovsky | 362/147 |
| 2003/0086259 | A1 * | 5/2003 | Kotovsky | 362/147 |
| 2003/0161153 | A1 * | 8/2003 | Patti | 362/289 |
| 2003/0161157 | A1 * | 8/2003 | Kotovsky | 362/372 |
| 2005/0002184 | A1 * | 1/2005 | Kotovsky | 362/147 |
| 2006/0092638 | A1 * | 5/2006 | Harwood | 362/249 |
| 2007/0111754 | A1 | 5/2007 | Marshall et al. | |
| 2009/0097262 | A1 * | 4/2009 | Zhang et al. | 362/364 |
| 2010/0029268 | A1 | 2/2010 | Myer et al. | |
| 2010/0061108 | A1 * | 3/2010 | Zhang et al. | 362/364 |
| 2010/0141153 | A1 | 6/2010 | Recker et al. | |

OTHER PUBLICATIONS

International Search Report and Written Opinion in International Application No. PCT/US2011/064494 mailed May 2, 2012.
Notification Concerning Transmittal of the International Preliminary Report on Patentability of Application No. PCT/US2011/064494 mailed Jun. 27, 2013.
International Preliminary Report on Patentability of Application No. PCT/US2011/064494 mailed Jun. 18, 2013.

* cited by examiner

*Primary Examiner* — John A Ward
(74) *Attorney, Agent, or Firm* — Arent Fox LLP (57) ABSTRACT

Gimbaled LED array module. In an aspect, In an LED mounting assembly is provided for directing light emitted from an LED array. The LED mounting assembly includes a gimbaled assembly configured to receive the LED array and to allow for positioning the LED array to direct the light emitted from the LED array. The LED mounting assembly also includes a body portion configured to receive the gimbaled assembly, and a connector coupled to the body portion, the connector configured to provide at least one of an electrical connection and a mechanical connection for the mounting assembly.

50 Claims, 7 Drawing Sheets

GIMBALED LED ARRAY MODULE

CLAIM OF PRIORITY UNDER 35 U.S.C. §119

This patent application claims the benefit of priority from U.S. Provisional Patent Application No. 61/423,016, entitled "SOCKETED GYROSCOPIC LED ARRAY MODULE" filed on Dec. 14, 2010 and assigned to the assignee hereof and hereby expressly incorporated by reference herein.

This patent application claims the benefit of priority from U.S. Provisional Patent Application No. 61/423,022, entitled "SOCKETED MOUNTING FIXTURE" filed on Dec. 14, 2010 and assigned to the assignee hereof and hereby expressly incorporated by reference herein.

BACKGROUND

A light emitting diode comprises a semiconductor material impregnated, or doped, with impurities. These impurities add "electrons" and "holes" to the semiconductor, which can move in the material relatively freely. Depending on the kind of impurity, a doped region of the semiconductor can have predominantly electrons or holes, and is referred to as an n-type or p-type semiconductor region, respectively.

In LED applications, an LED semiconductor chip includes an n-type semiconductor region and a p-type semiconductor region. A reverse electric field is created at the junction between the two regions, which causes the electrons and holes to move away from the junction to form an active region. When a forward voltage sufficient to overcome the reverse electric field is applied across the p-n junction, electrons and holes are forced into the active region and combine. When electrons combine with holes, they fall to lower energy levels and release energy in the form of light. The ability of LED semiconductors to emit light has allowed these semiconductors to be used in a variety of lighting devices. For example, LED semiconductors may be used in general lighting devices for interior or exterior applications.

Various techniques have been tried to improve the light output and directionality LED arrays. For example, with regards to directionality, the addition of a lens that covers the entire LED array has been used in an attempt to extract light and control the directionality of the emitted light. For example, a conventional array of LEDs will normally create a round beam pattern on the ground. Unfortunately, this technique to control the directionality of light emitted from an LED array does not perform as well as desired. For example, it is desirable to have a way to create specific beam patterns and to focus those beam patterns in a specific direction.

Accordingly, what is needed is a simple and cost efficient way to focus and direct the light emitted from an LED array.

SUMMARY

In various aspects, a gimbaled LED array module is provided that allows light emitted from an LED array to be focused and aimed in a specific direction. In various implementations, the gimbaled LED array module provides one or more connectors for quick connection and disconnection of electrical and mechanical connections. A gimbaled mechanism is provided that allows the light from an LED array to be directed in virtually any desired direction. The module also comprises a radial heat sink to facilitate efficient heat dissipation regardless of the orientation and/or directional positioning of the LED array.

In an aspect, an LED mounting assembly is provided for directing light emitted from an LED array. The LED mounting assembly comprises a gimbaled assembly configured to receive the LED array and to allow for positioning the LED array to direct the light emitted from the LED array. The LED mounting assembly also comprises a body portion configured to receive the gimbaled assembly, and a connector coupled to the body portion, the connector configured to provide at least one of an electrical connection and a mechanical connection for the mounting assembly.

In an aspect, a lighting fixture is provided for directing light emitted from an LED array. The lighting fixture comprises a lamp head and at least one LED mounting assembly coupled to the lamp head. The LED mounting assembly comprises a gimbaled assembly configured to receive an LED array and to allow for positioning the LED array to direct the light emitted from the LED array. The LED mounting assembly also comprises a body portion configured to receive the gimbaled assembly, and a connector coupled to the body portion. The connector configured to provide at least one of an electrical connection and a mechanical connection to the body portion.

In an aspect, a lighting system is provided for directing light emitted from a plurality of lighting fixtures. The lighting system comprises a central controller and a plurality of lighting fixtures in communication with the central controller. Each lighting fixture comprising at least one LED mounting assembly comprising a gimbaled assembly configured to receive an LED array and to allow for positioning the LED array to direct the light emitted from the LED array. The LED mounting assembly also comprises a body portion configured to receive the gimbaled assembly, and a connector coupled to the body portion. The connector configured to provide at least one of an electrical connection and a mechanical connection to the body portion.

It is understood that aspects of the present invention will become readily apparent to those skilled in the art from the following detailed description. As will be realized, the present invention includes other and different aspects and its several details are capable of modification in various other respects, all without departing from the spirit and scope of the present invention. Accordingly, the Drawings and Description are to be regarded as illustrative in nature and not as restrictive.

BRIEF DESCRIPTION OF THE DRAWINGS

The foregoing aspects described herein will become more readily apparent by reference to the following Description when taken in conjunction with the accompanying drawings wherein.

DESCRIPTION

The present invention is described more fully hereinafter with reference to the accompanying drawings, in which various aspects of the present invention are shown. This invention may, however, be embodied in many different forms and should not be construed as limited to the various aspects of the present invention presented throughout this disclosure. Rather, these aspects are provided so that this disclosure will be thorough and complete, and will fully convey the scope of the present invention to those skilled in the art. The various aspects of the present invention illustrated in the drawings may not be drawn to scale. Accordingly, the dimensions of the various features may be expanded or reduced for clarity. In addition, some of the drawings may be simplified for clarity. Thus, the drawings may not depict all of the components of a given apparatus (e.g., device) or method.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes may not be intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the Drawings. By way of example, if an apparatus in the Drawings is turned over, elements described as being on the "lower" side of other elements would then be oriented on the "upper" sides of the other elements. The term "lower", can therefore, encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items It will be understood that although the terms "first" and "second" may be used herein to describe various regions, layers and/or sections, these regions, layers and/or sections should not be limited by these terms. These terms are only used to distinguish one region, layer or section from another region, layer or section. Thus, a first region, layer or section discussed below could be termed a second region, layer or section, and similarly, a second region, layer or section may be termed a first region, layer or section without departing from the teachings of the present invention.

Figure 1A:
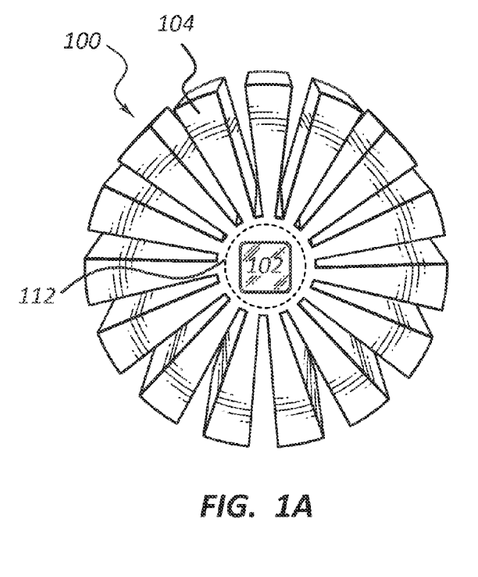
FIG. 1A shows a bottom view of an exemplary radial heat sink for dissipating heat from an LED array.

FIG. 1A shows a bottom view of an exemplary radial heat sink 100 for dissipating heat from an LED array. For example, the radial heat sink 100 is suitably constructed for use in a street light fixture. The heat sink 100 is comprised of metal (such as steel or aluminum) or other heat dissipating material including ceramics, composites or thermoplastics. The heat sink 100 is configured to have a center region configured to mount an LED light source 102 (hereinafter "LED"). For example, the LED 102 comprises at least one of an LED die, LED array, LED emitter, an array of emitters, an array of LED arrays, a printed circuit board with LED emitters and a solid state LED lighting device. As discussed in detail below, the center region is further configured to route power and any other required signals to the LED 102.

In one implementation, the LED 102 is mounted to the center region using fasteners, adhesive or other attachment means to provide an environmentally protective (IP rated) seal 112. For example, in one implementation, the IP rated seal 112 is provided to cover the LED 102. For example, various embodiments of an IP rated seal suitable for use as the seal 112 can be found in U.S. patent application Ser. No. 13/085,665 entitled "APPARATUS PROVIDING BEAMFORMING AND ENVIRONMENTAL PROTECTION FOR LED LIGHT SOURCES" filed on Apr. 13, 2011 and assigned to the assignee hereof.

The radial heat sink 100 comprises a plurality of fins, such as fin 104, which operate to dissipate heat generated from the LED 102. For example, heat generated by the operation of the LED 102 is dissipated to all of the radial fins. The radial design provides efficient heat dissipation by taking advantage of the fact that heated air rises. For example, since roadway lights have LED arrays that emit light vertically downward, the radial heat sink 100 is designed to be is positioned in a horizontal orientation when installed in a roadway light. The horizontal orientation allows heated air to rise vertically past the fins. Thus, as the operation of the LED 102 generates heat that flows to the fins, air between the fins begins to heat and rise, which causes air to flow across the fins and dissipates heat from the heat sink 100.

Thus, radial heat sink 100 provides superior heat dissipation when compared to conventional rectangular (i.e., solid) heat sinks, which when mounted in a horizontal orientation, require air to move horizontally across their heat dissipating surfaces. Because heated air rises vertically, the efficiency of such conventional heat sinks may be greatly reduced.

Figure 1B:
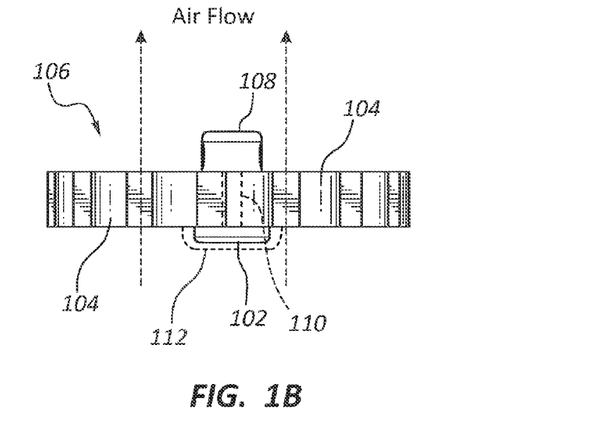
FIG. 1B shows an end view of the exemplary radial heat sink shown in FIG. 1A.

FIG. 1B illustrates an end view 106 of the heat sink 100. The end view 106 illustrates how heated air creates air flow that moves past the fins (i.e. fin 104) to provide efficient heat dissipation. The LED 102 that is mounted to the bottom side of the radial heat sink 100 and its encapsulation 112 are also shown in the end view 106. In one implementation, a driver 108 is mounted on the reverse (or top) side of the center region of the heat sink 100. In this configuration, drive signals from the driver 108 are routed to the LED 102 through an opening 110 in the center region of the heat sink 100.

Figure 2:
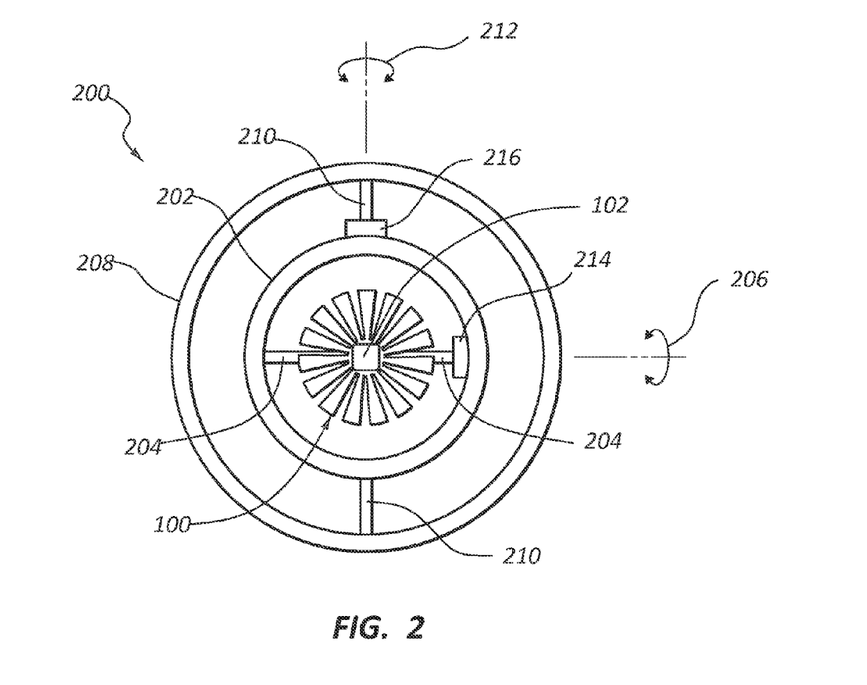
FIG. 2 shows a bottom view of an exemplary gimbaled mechanism for directing the light emitted from an LED array mounted in the radial heat sink of FIG. 1.

FIG. 2 shows a bottom view of an exemplary gimbaled mechanism 200 for directing the light emitted from an LED array mounted on the radial heat sink 100. For example, the radial heat sink 100 with LED 102 is mounted to an inner ring 202 by a first set of rotatable arms 204. In one implementation, a top surface of the radial heat sink 100 is mounted to the rotatable arms 204 using screws or other mounting means. In another implementation, the rotatable arms 204 are attached to ends of the fins of the heat sink 100. The rotatable arms 204 allow the radial heat sink 100 to rotate around a first axis as illustrated at 206. For example, the rotatable arms 204 are connected to the inner ring 202 and the radial heat sink 100 using pins, screws, inserted posts, ball and socket joints or any other mechanism that allows the radial heat sink 100 to rotate in the direction indicated at 206 with respect to the inner ring 202.

In one implementation, an alignment and locking mechanism 214 is provided that operates to allow alignment of the radial heat sink 100 to a particular position. The alignment mechanism 214 comprises a gauge or other markings, or mechanical stops that assist in aligning the radial heat sink 100 to a selected position or rotation with respect to the inner ring 202. In another implementation, the mechanism 214 comprises an electro-mechanical drive mechanism that is configured to rotate the radial heat sink 100 based in electrical drive signals from a controller. Thus, positioning of the radial heat sink can be remotely controlled. The mechanism 214 also provides a locking mechanism, such as a pin, set screw or other means, allow the radial heat sink to be locked in the selected position.

The inner ring 202 is mounted to an outer ring 208 by a second set of rotatable arms 210. The rotatable arms 210 allow the outer ring 208 to rotate around a second axis as illustrated at 212. For example, the rotatable arms 210 are connected to the inner ring 202 and the outer ring 208 using pins, screws, inserted posts, a ball and socket joint or any other mechanism that allows the inner ring 202 to rotate in the direction indicated at 212 with respect to the outer ring 208. In one implementation, an alignment and locking mechanism 216 is provided that operates to allow alignment of the inner ring 202 to a particular position or rotation with respect to the outer ring 208. The alignment mechanism 216 may have a gauge or other markings, or mechanical stops that assist in aligning the inner ring 202 to a selected position.

In another implementation, the mechanism 216 comprises an electro-mechanical drive mechanism that is configured to rotate the inner ring 202 based in electrical drive signals from a controller. Thus, positioning of the inner ring can be remotely controlled. The mechanism 216 also provides a locking mechanism, such as a pin, set screw or other means, allow the inner ring 202 to be locked in the selected position. Thus, the heat sink 100 and the inner ring 202 can be rotated around two axes to allow the LED 102 to be positioned to emit light in any desired direction. Such positioning can be done either manually or electrically based on electronic positioning signals received from a remote controller.

Thus, the gimbaled mechanism 200 provides a single module that provides for efficient heat dissipation and allows the light emitted from the LED 102 to be aimed in any desired direction. For example, if the mechanism 200 is mounted in a roadway light, the rotatable arms 204 and 210 allow the light emitted from the LED 102 to be directed to illuminate selected portions of the roadway, sidewalk, business front, or other areas within the vicinity of the roadway light. It should be noted that the mechanism 200 in not limited to roadway lighting, and may be used in a variety of interior and exterior lighting applications.

Figure 3:
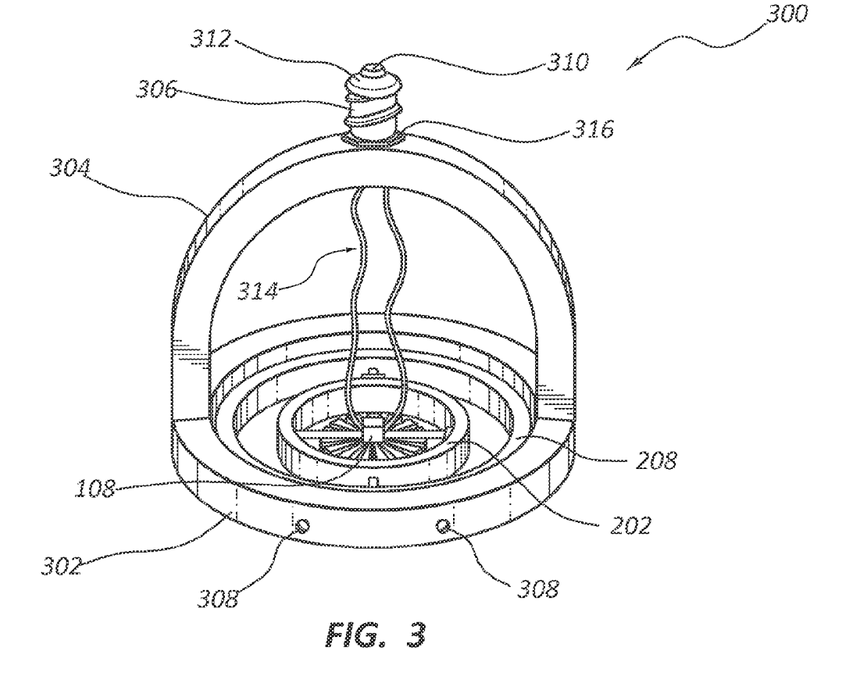
FIG. 3 shows an exemplary LED mounting assembly configured to mount the gimbaled mechanism of FIG. 2 to a light fixture.

FIG. 3 shows an exemplary LED mounting assembly 300 configured to mount the gimbaled mechanism 200 (including the radial heat sink 100) to a light fixture, such as a roadway light fixture. The assembly 300 comprises a body portion 302 that is configured to mount the gimbaled mechanism 200 that holds the radial heat sink 100 with LED 102. For example, the outer ring 208 of the mechanism 200 is mounted to the body portion 302 using screws 308 or other types of fasteners.

The LED mounting assembly 300 also comprises a mounting arm 304 that couples the body portion 302 to a universal mounting connector 306. The mounting arm 304 is shown having an inverted "U" shape but may be configured to have other types of shapes, such as an inverted "V" shape. The mounting arm 304 also comprises an opening at the location of the connector 306 to allow signal wires from the connector to pass through as they are routed to the driver 108 mounted to the top surface of the radial heat sink.

The universal mounting connector 306 is a mechanical connector or coupling that allows the assembly 300 to be mounted to a variety of light fixtures. The universal mounting connector 306 can be further configured with electrical contacts or connectors to allow power or other signals to be routed to the LED array. For example, the connector 306 comprises a first contact 310 and a second contact 312. In one implementation, the connector 306 is screwed into the mounting arm 304. In another implementation, the connector 306 is welded or otherwise attached to the mounting arm 304. Thus, the connector 306 can be configured to provide one or both of electrical and mechanical connections. If desired, electrical connections can be provided separately from the connector 306 using any other type of electrical connection.

In one implementation, the mounting connector 306 comprises wires 314 coupled to the connector 306 to route electrical signals to the LED 102. The connector 306 comprises a gasket 316 or other mechanism that provides environmental protection such that the connections to the wires 314 are protected from the environment. The wires can be routed directly to the LED 102 with enough slack to allow full motion and adjustment of the mechanism 200. In another implementation, the wires are routed along the arms of the mounting assembly to the LED. In still another embodiment, the wires are routed internally through the arms so that they are completely within the assembly 300. The wires may also be hidden with a cable shield or cable box. In still another embodiment, the wires 314 comprise electrical drive signals that drive the alignment mechanisms 214 and 216 to allow for remote control and positioning of the radial heat sink and LED array mounted thereon.

In various implementations, the LED mounting assembly 300 allows for rapid installation of the mechanism 200 and for easy replacement, repairs or upgrades. The connector 306 provides universal mechanical and electrical connections, but may not be part of the thermal management system, which is provided by the radial heat sink 100. In one implementation, the connector 306 is configured similarly to standard connectors used for the types of conventional bulbs that are commonly used in roadway lighting. Such a connector provides both mechanical and electrical connections and allows for plug and play functionality.

Figure 4:
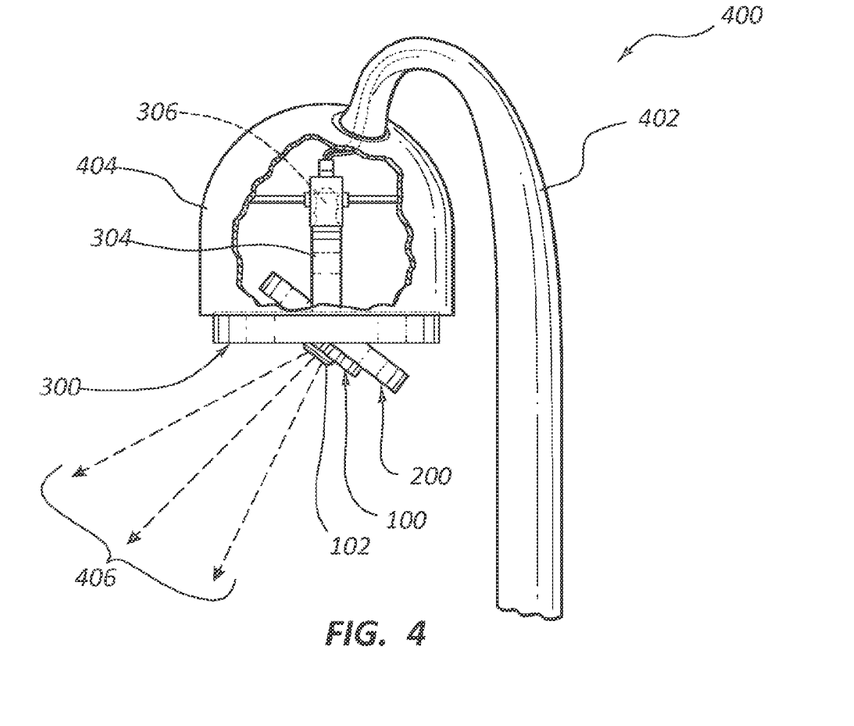
FIG. 4 shows an exemplary lighting fixture comprising the mounting assembly of FIG. 3

FIG. 4 shows an exemplary lighting fixture 400 comprising the LED mounting assembly 300. The fixture 400 comprises a post 402 having a lamp head 404 mounted thereon. The fixture 400 may be any type of fixture, such as a roadway light, down light or any other type of lighting fixture for exterior or interior applications.

The lamp head 404 is configured to accept the LED mounting assembly 300. Also shown in FIG. 4 is the gimbaled mechanism 200, the radial heat sink 100 and LED 102. The mounting arm 304 is shown and illustrates how the mounting connector 306 is coupled to the lamp head 404. In one implementation, the mounting connector 306 is configured to provide both mechanical and electrical connections when installed into the lamp head 404. As a result, the LED 102 can be positioned using the gimbaled mechanism 200 to provide a beam pattern 406 that is directed to illuminate any desired region or area in the vicinity of the fixture 400. Regardless of the position selected, the generally horizontal position of the radial heat sink 100 allows heated air to rise across the surface of the fins to provide heat dissipation for the LED 102.

Figure 5:
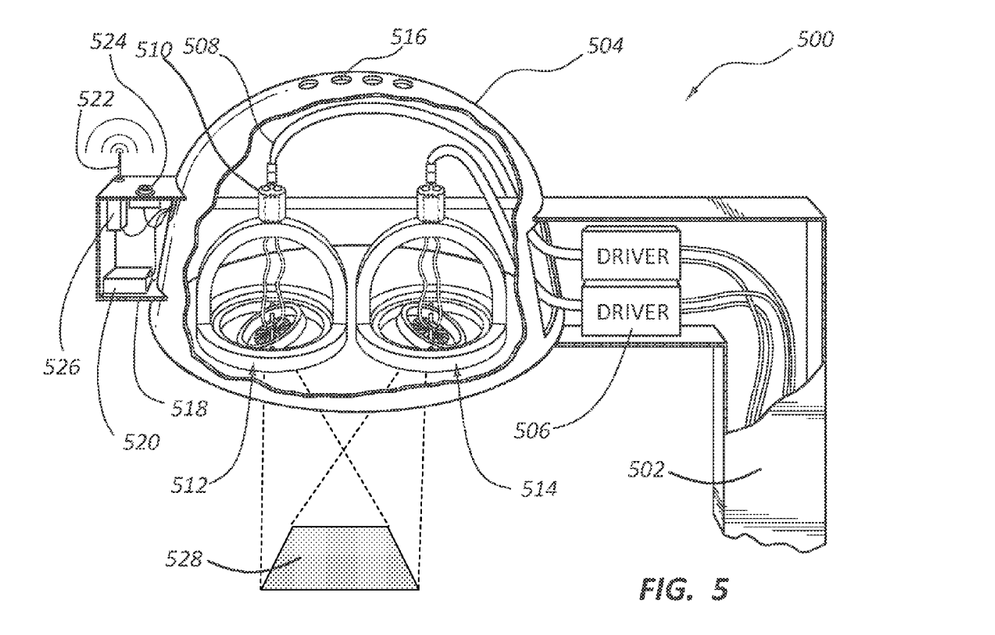
FIG. 5 shows an exemplary socketed lighting fixture.

FIG. 5 shows an exemplary socketed lighting fixture 500. For example, the fixture 500 is suitably constructed for use as a roadway light. The fixture 500 comprises a lamp head 504 that is mounted to a mounting post 502. The following description describes various aspects of the socketed lighting fixture 500.

Configurable Socket Arrangement for LED Mounting Assemblies

The socketed lighting fixture 500 provides for rapid installation and replacement of LED mounting assemblies, such as the LED mounting assembly 300 shown in FIG. 3. In one implementation, the fixture 500 comprises one or more sockets 510 that include both mechanical and electrical connections and are configured to mate with connectors (i.e., connector 306) on LED mounting assemblies 512 and 514. Although two sockets 510 are shown in FIG. 5, the socketed lighting fixture 500 can be configured to provide any number of sockets in any configurable arrangement. For example, the fixture 500 can provide four sockets arranged in a 2×2 or 4×1 configuration. The sockets 510 provide for quick connect/disconnect of the LED mounting assemblies 512 and 514 to facilitate plug and play functionality.

Adjustable Beam Pattern

The fixture 500 provides for adjustable beam patterns to allow light to be focused in any particular direction. For example, the LED mounting assemblies 512 and 514 can be adjusted to produce an overlapping beam pattern 528. For example, the inner ring and heat sink of the LED mounting assemblies 512 and 514 can be adjusted to direct light emitted from their associated LEDs to produce the beam pattern 528. This can be accomplished by manual adjustment or by using electrical positioning signals that are delivered to the mechanism 200 and drive the alignment mechanisms 214 and 216. It should also be noted that the LED mounting assemblies 512 and 514 can be manually or electrically adjusted to form other types of beam patterns.

Figure 6:
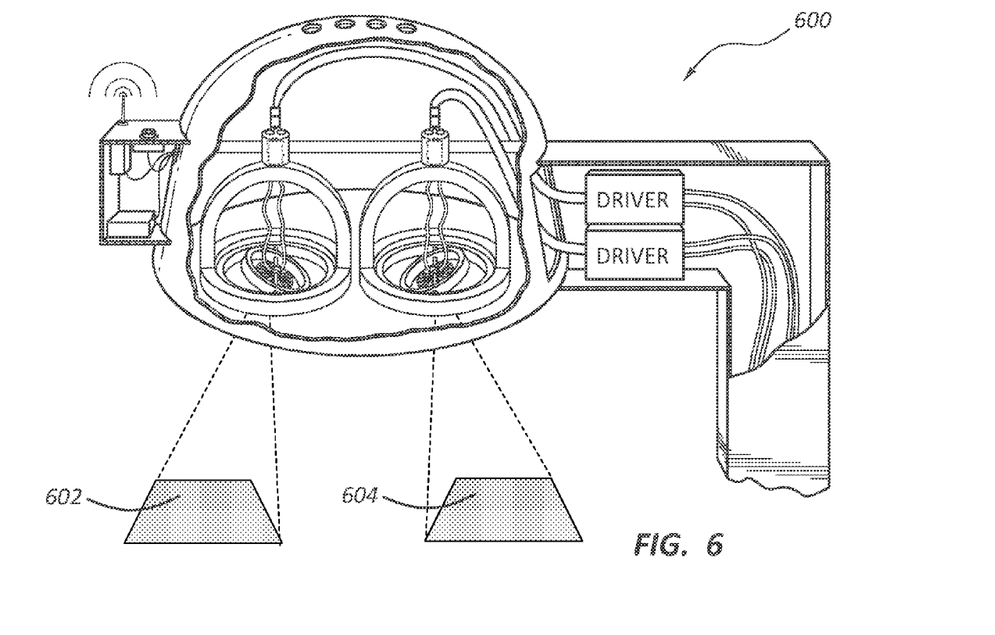
FIG. 6 shows an exemplary socketed lighting fixture.

FIG. 6 shows an exemplary socketed lighting fixture 600. The fixture 600 is identical to the fixture 500 except that the LED mounting assemblies 512 and 514 are configured to form two beam patterns 602 and 604. For example, the inner ring and heat sink of the LED assemblies 512 and 514 are adjusted to direct light emitted from their associated LEDs to produce the beam patterns 602 and 604. This can be accomplished by manual adjustment or by using electrical positioning signals that are delivered to the mechanism 200 and drive the alignment mechanisms 214 and 216. Thus, the fixture 600 illustrates how the gimbaled mechanism 200 of the LED mounting assemblies 512 and 514 allows virtually any desired beam pattern to be formed in any desired direction.

Integrated Airflow Pathways

Referring again to FIG. 5, the fixture 500 comprises airflow openings 516 located at the top portion of the lamp head 504 to facilitate proper airflow through the fixture 500 to dissipate heat generated by the LED mounting assemblies 512 and 514. For example, heat generated by the LED mounting assemblies 512 and 514 flow upwards and exits through the openings 516. In one implementation, the openings 516 are located at a position that is offset from the LED mounting assemblies 512 and 514 so as to protect the assemblies from any material or substance that may work through the openings 516 and interfere or disrupt the operation of the LED mounting assemblies 512 and 514. In one implementation, the bottom of the fixture 500 is fully open. In another implementation, the bottom of the fixture 500 has a cover that includes a system of through holes to facilitate air flow. In one implementation, the all openings in the fixture 500 are protected from bugs or birds or other intrusions with a mesh material thereby further reducing contamination risk.

Anti-Nesting Surface

In one implementation, the lamp head 504 is shaped to prevent the nesting of birds or other animals/insects. For example, the shape of the lamp head 504 is rounded to prevent birds or other animals from using the top of the lamp head 504 as a nesting location.

Optional Driver Circuitry

In one implementation, the LED assemblies 512 and 514 comprise their own driver circuitry. In this implementation, power and other signals are routed (via cables 508) to the LED mounting assemblies 512 and 514 using the connectors 510. The appropriate drive signals are generated by a drive circuit located at each of the LED assemblies 512 and 514. In another implementation, electrical signals are provided to optional driver circuits 506 and the output of the driver circuits 506 are routed (via cables 508) to the LED assemblies 512 and 514 using the connectors 510. Electrical positioning signals can also be generated or routed through the drivers 506 and passed to the LED mounting assemblies 512 and 514 through the connectors 510.

Accessory Devices

In one implementation, the fixture 500 comprises accessory devices 518 which can be used to enhance the operation of the fixture or provide additional information to a centralized controller. For example, in one implementation, the fixture comprises a solar detector 524 configured to detect night time conditions that can be used to control the operation of the fixture 500. In another implementation, the fixture comprises an antenna 522 and corresponding radio electronics 526 that are configure to communicate using any type of communication interface, for example, cellular, WiFi, Bluetooth or by using any other type of communication technology. The fixture may also comprise a sensor package 520 that includes various sensors such as a camera, CCTV device, radar, motion sensor, RFID detector, and/or any other type of sensor.

In another implementation, the radio electronics 526 receives positioning signals from a central entity and passes these signals to the LED mounting assemblies 512 and 514 to position their respective radial heat sinks accordingly.

Figure 7:
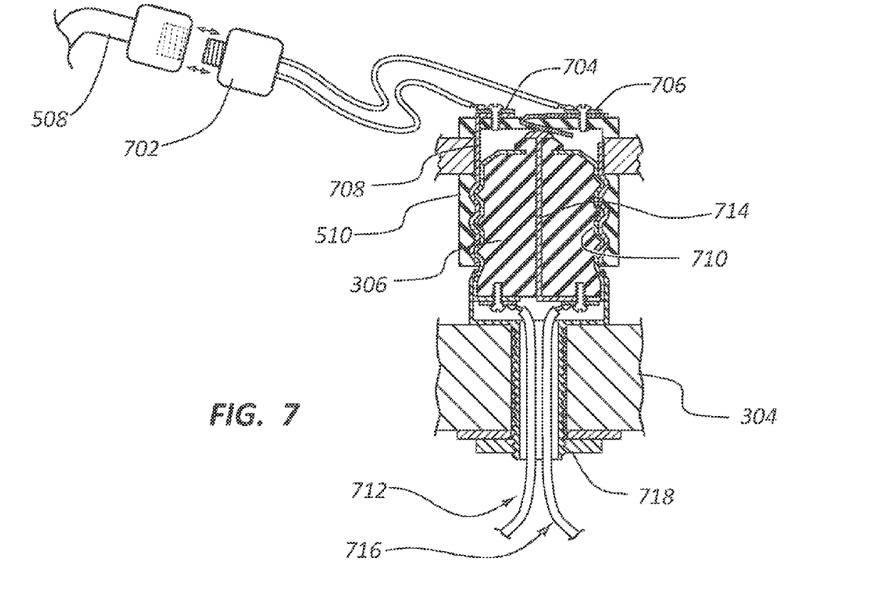
FIG. 7 shows a detailed view of a socket illustrated in FIG. 5.

FIG. 7 shows a detailed view of the socket 510 illustrated in FIG. 5. The socket 510 is shown coupled to a mating connector 306 that is part of one of the LED mounting assemblies 512 or 514. For example, in one implementation, the mating connector 306 comprises threads that screw into the socket 510. In other implementations, the mating connector couples to the socket using any type of coupling to provide a quick attachment and release mechanism for easy installation and removal of a LED mounting assembly.

An electrical connector 702 couples signals from the cable 508 to a first contact 704 and a second contact 706 of the socket 510. The first contact 704 couples its signal to a thread contact 708 of the connector 510. The thread contact 708 comes in contact with a mating thread contact 710 of the mating connector 306 which routes the signal to the wire 712.

The second contact 706 couples its signal to a pin contact 714 of the connector 306. The pin contact 714 then routes the received signals to wire 716. In one implementation, the wires 712 and 716 are protected by a gasket 718 or other environmentally protective seal. Thus, the socket 510 provides a quick and efficient mechanism for connecting and disconnecting LED mounting assemblies.

Figure 8:
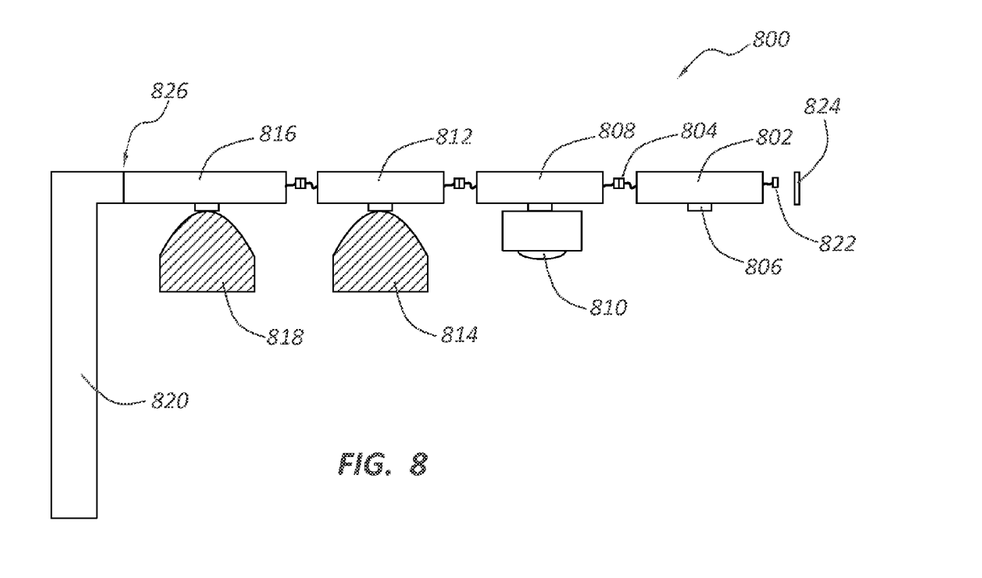
FIG. 8 shows an exemplary lighting assembly for use with embodiments of the LED mounting assembly shown in FIG. 3.

FIG. 8 shows an exemplary lighting assembly 800 for use with embodiments of the LED assembly 300 shown in FIG. 3. The assembly 800 comprises a T-assembly 802. The T-assembly 802 comprises a first electrical connection 804 and a second electrical connection 822 that operate to feed electrical signals through the T-assembly 802. The T-assembly 802 also comprises a mounting connector 806 that also couples to the connectors 804 and 822. For example, in one implementation, the mounting connector 806 is the socket connector 510 shown in FIG. 5.

Using one or more of the T-assembly 802 makes is possible to mount a variety of devices on a support post 820. For example, a T-assembly 816 is coupled to the post 820 and is used to mount an LED mounting assembly 818. For example, the LED mounting assembly 818 may be the LED mounting assembly 300 shown in FIG. 3. The T-assembly 816 is mounted to the post at location 826 using screws or other fasteners.

Another T-assembly 812 is electrically and mechanically coupled to the T-assembly 816 and is used to mount an LED mounting assembly 814. Another T-assembly 808 is coupled to the T-assembly 812 and used to mount a CCTV camera 810. If the T-assembly 802 is the last T-assembly to be mounted to the post, an end cap 824 is used to protect the unconnected end of the T-assembly 802 and the connector 822.

Thus, one or more T-assemblies can be both mechanically and electrically coupled together to allow any number of LED mounting assemblies and other devices to be mounted to the post 820.

Figure 9:
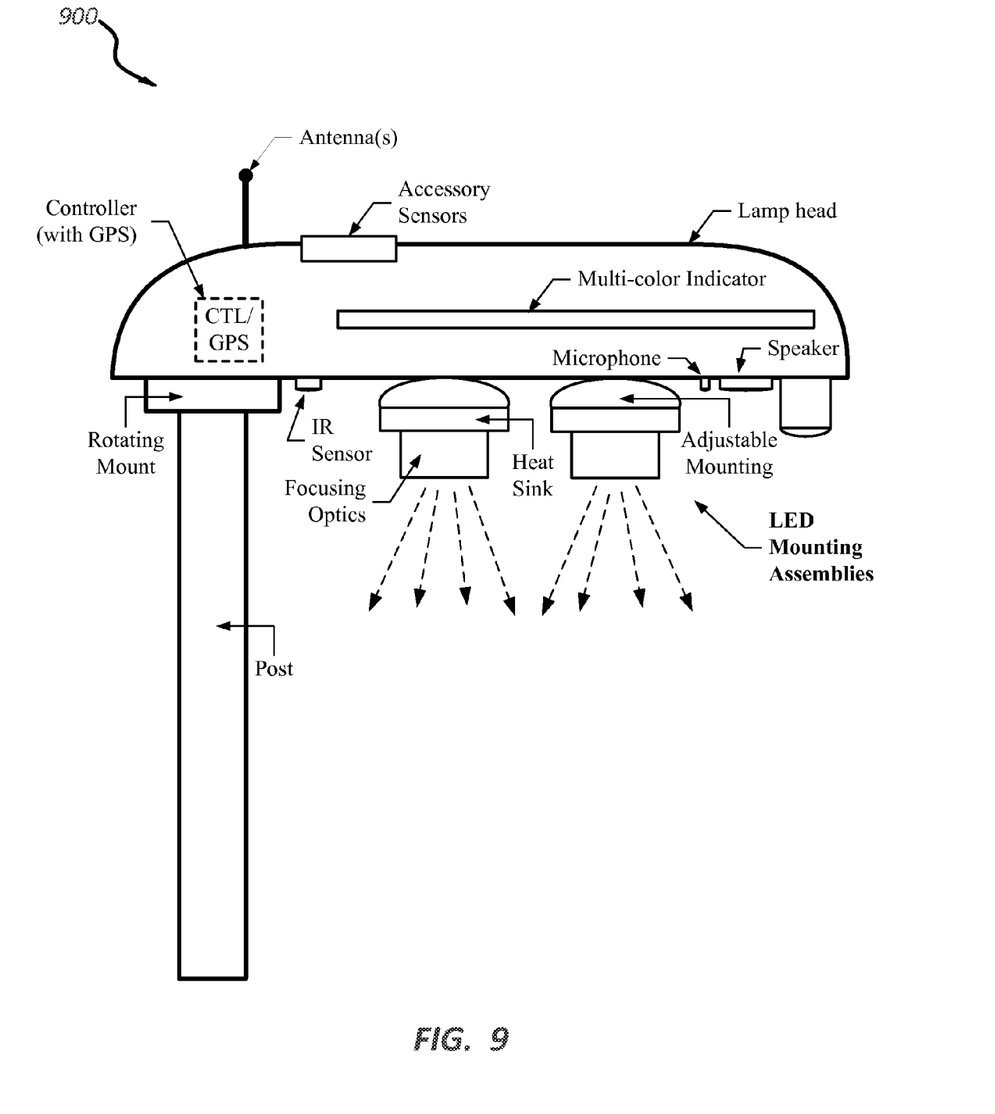
FIG. 9 shows an exemplary lighting fixture with extended functionality.

FIG. 9 shows an exemplary lighting fixture 900 with extended functionality. The lighting fixture 900 comprises the following features.

Lamp Head

The light module 900 comprises a lamp head mounted to a post with a rotatable mount. For example, the rotatable mount allows the lamp head to rotate in either direction around the post to achieve a full 360 degrees of rotation. By rotating the lamp head it is possible to illuminate areas around the post. The lamp head is made from metal or other weather resistance material.

LED Mounting Assemblies

One or more LED mounting assemblies are coupled to the lamp head using adjustable mounts that allow the LED mounting assemblies to be positioned, either manually or automatically, to any desired position. Each LED mounting assembly includes one or more LED light sources coupled to a radial heat sink and focusing optics. The focusing optics allow any desired beam pattern to be produced by the light modules. For example, in one implementation, the LED mounting assemblies comprise the LED mounting assembly 300 with gimbaled mechanism 200 shown in FIG. 3. In one implementation, the alignment mechanisms 214 and 216 receive positioning signals from the controller and adjust the position of their radial heat sink accordingly to adjust the position of the resulting light beam pattern.

Camera

A camera is positioned at the end of the Lamp Head and is capable of capturing still images or full motion video in either black and white or color. The camera includes controllable focusing, zoom, and panning capabilities. For example, in one implementation, the camera is a close circuit television camera (CCTV) camera that is capable of capturing high quality video images.

Speaker and Microphone

A speaker and microphone are provided on the Lamp Head. The microphone operates to capture audio and the speaker provides a mechanism for sounding alarms or reproducing voice or other sounds.

Infrared Sensor

An infrared sensor is provided on the Lamp Head to allow remote control or other communications with the Lamp Head from a location below the Lamp Head. For example, a police officer may communicate with the Lamp Head using a remote control IR device.

Multi-Color Indicator

A multi-color indicator is provided on the Lamp Head to indicate various alert conditions. For example, the indicator may emit red, yellow, or green light to indicate road conditions to passing vehicles. The indicator may also flash or blink if desired.

Accessory Sensors

The Lamp Head includes accessory sensors, such as a light detector, speed detector, automatic toll payment detector, temperature sensor, rain detector and/or any other type of sensor.

Controller with GPS

The Lamp Head includes a controller with GPS capabilities. The controller functions to interface with and control the various features and functions of the Lamp Head. For example, the controller may control the color of the multi-color indicator, pan and/or zoom the camera, adjust the beam pattern of the LED mounting assemblies, or rotate the Lamp Head on the post. The controller also includes communication and GPS capability so that the controller can communicate with a central entity and so that the exact geographic location of the Lamp Head can be determined. A more detailed description of the controller and its operation is provided below.

One or More Antennas

The lamp head also includes one or more antennas that are used to provide wireless communication using cellular, WiFi, Bluetooth or other communication technology. An Antenna is also provided to allow reception of GPS signals.

Controller Implementations

Figure 10:
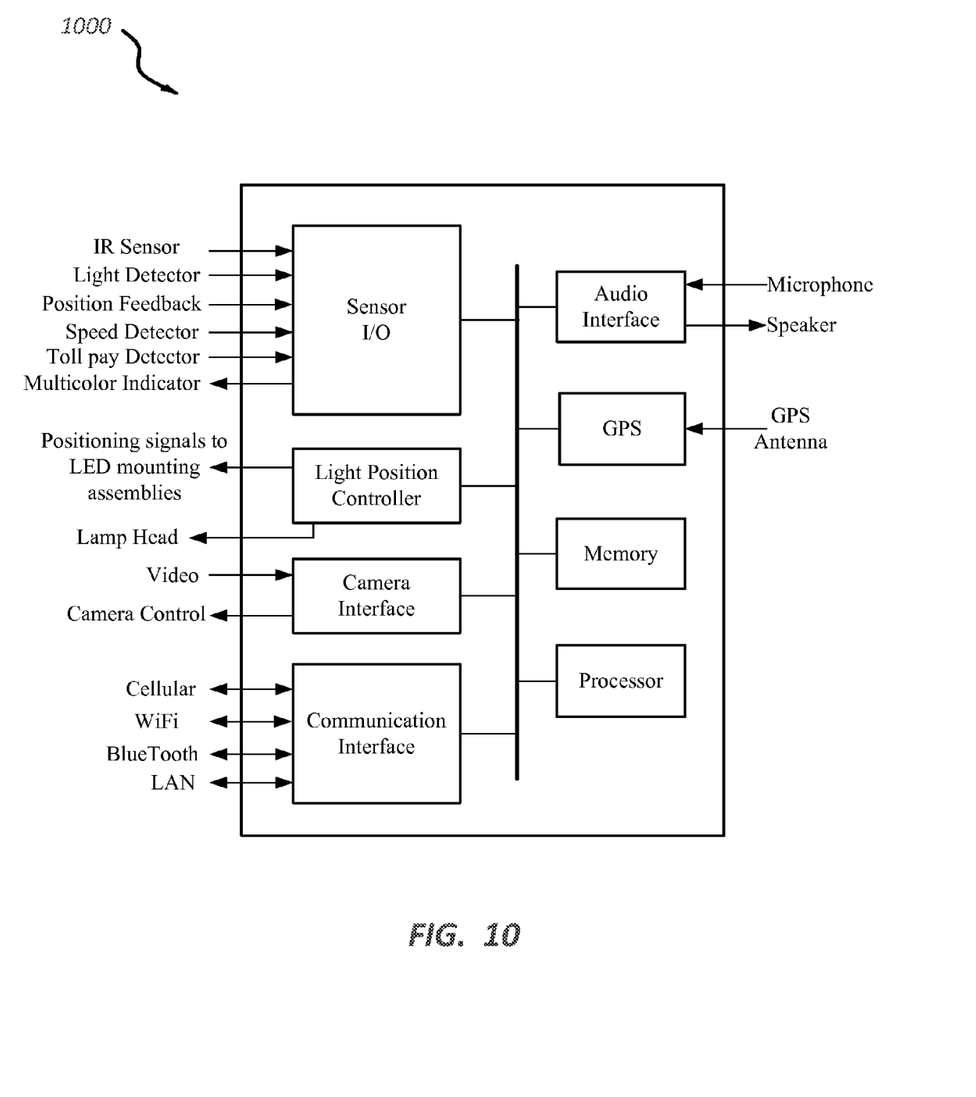
FIG. 10 shows a detailed view of a controller for use with the lighting fixture of FIG. 9.

FIG. 10 shows a detailed view of a controller 1000. For example, the controller 1000 is suitable for use at the controller shown in FIG. 9. The controller 1000 comprises the following functional blocks, which are coupled together to communicate with each other over an internal data bus.

Processor and Memory

A processor operates to control the overall functionality of the controller. The processor may execute instructions stored in a memory and/or control the operation of various other functional blocks. The memory may also store initialization information, temporary values, images and sounds, or other operational information.

GPS

The controller includes a GPS system that is coupled to an antenna to acquire and process GPS signals. The GPS system operates to determine the exact location of the Lamp Head and can store this information in the memory or communicate this information to other entities using the communication interface.

Audio Interface

The audio interface operates to receive sound information from a microphone mounted on the Lamp Head, or to send sound information to be broadcast from a speaker mounted on the Lamp Head.

Sensor Input/Output

The sensor I/O operates to send and receive sensor information. For example, information is received from the IR sensor, light detector, position feedback, speed detector, and fast track detector. The sensor I/O is capable of receiving inputs from any other type of sensor provided on the Lamp Head. Furthermore, the sensor I/O operates to output information, such as multicolor indicator control signals to control the operation of the multicolor indicator.

Light Position Controller

The light position controller operates to control the positioning of the LED mounting assemblies or the Lamp Head position. For example, the processor may communicate a position for the lamp head to the light position controller, which in turns, sends out control signals to reposition the lamp head using the rotating mount accordingly. In another implementation, the light position controller outputs positioning signals that are passed to the LED mounting assemblies. The positioning signals operate to control the operation of the alignment mechanisms 214 and 216 to adjust the position of the radial heat sink and the inner ring of the gimbaled mechanism 200 to position the corresponding LED array to a selected position or orientation to form a desired beam pattern in a desired direction.

Camera Interface

The camera interface operates to output control signals to control the operation of the camera mounted on the Lamp Head. For example, the control signals may operate to focus, pan, zoom, activate or disable the camera. The camera interface also operates to receive still images or video from the camera. Such video can be stored in the memory and/or analyzed by the processor in real time to provide motion detection or other features.

Communication Interface

A communication interface operates to provide communications between the Lamp Head and external entities, such as central controllers, local equipment or local networks. For example, the communication interface includes circuitry to communicate over cellular, WiFi, or Bluetooth radio channels. The communication interface also provide for hard-wired communication over a local area network (LAN). For example, a LAN connection can be provided to the Lamp Head with the signal and power connections routed through the post.

Exemplary Installation

Figure 11:
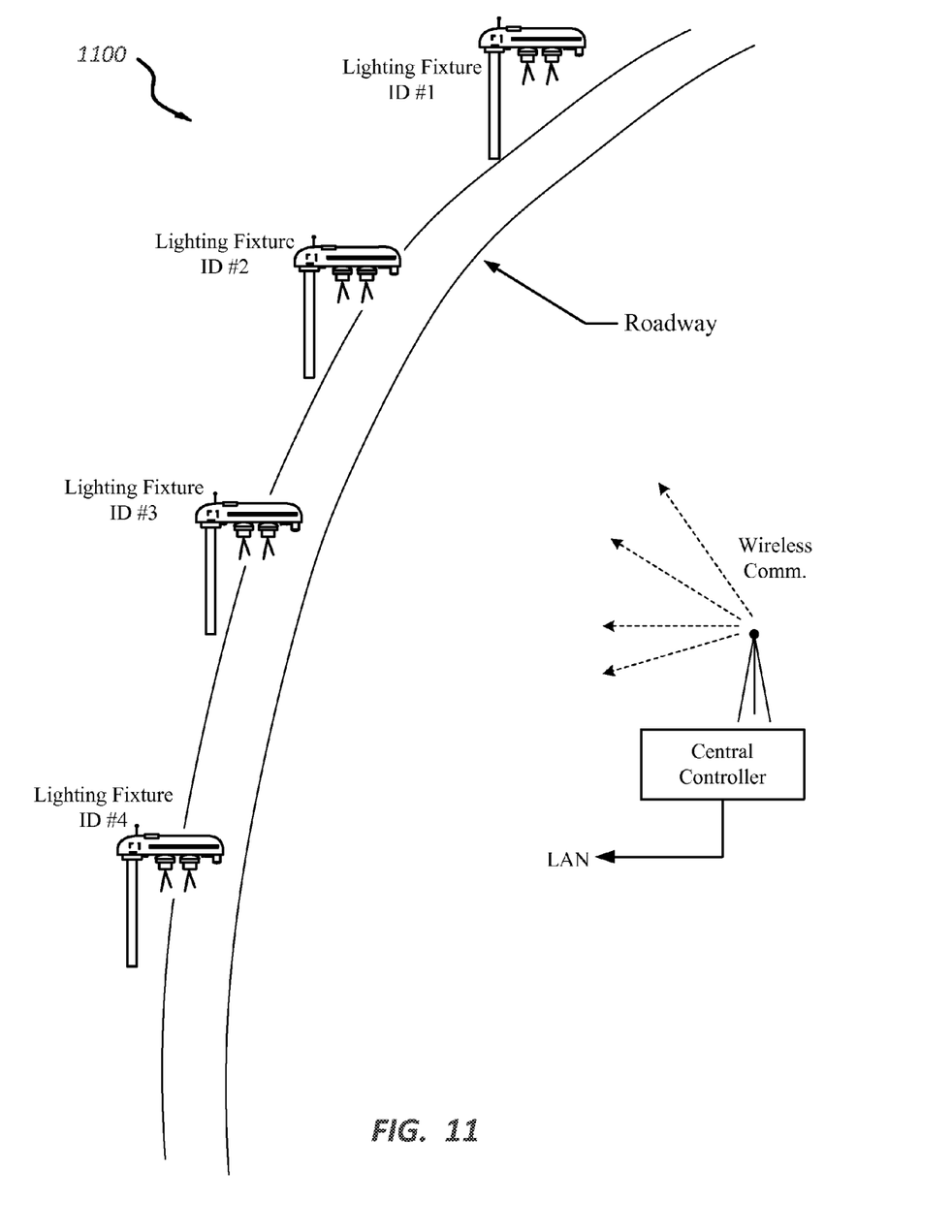
FIG. 11 shows an exemplary installation of a lighting system comprising four lighting fixtures (1-4) along a roadway.

FIG. 11 shows an exemplary installation 1100 of a lighting system comprising four lighting fixtures (1-4) along a roadway. For example, each of the lighting fixtures may be the lighting fixture 900 shown in FIG. 9. The lighting fixtures (1-4) are configured to operate under the control of a central controller that communicates using wireless and/or wired communications. The following features and functions are provided.

Lighting Functions

The central controller is operable to control the lighting fixtures (1-4) to provide a variety of lighting functions. For example, the central controller communicates with the controller of each lighting fixture using wireless and/or LAN communications. In one implementation, the central controller communicates light positioning information to the controller at a lighting fixture, which in turn, generates positioning signals that are passed to an LED mounting assembly mounted to the lighting fixture. The positioning signals control the orientation of the radial heat sink and the inner ring to position the associated LED array coupled to the radial heat sink. Thus, the central controller is operable to control the positioning of all the LED arrays of the four lighting fixtures. It should be noted that any number of lighting fixtures may be controlled by the central controller to provide an integrated lighting system for roadway use.

The following illumination functions are provided in various implementations of the lighting system.

1. Roadway illumination intensity adjustment
2. Adjustable beam patterns
3. Adjustable beam locations
4. Adjustable lamp head position to illuminate off road and shaded areas
5. Implementation of energy efficiency strategies (dimming, etc)

Camera Functions

The central controller is operable to control the camera to provide the following camera functions.

1. Full motion video acquisition
2. Still images acquisition
3. Image detection
4. Day/Night detection
5. Parking monitoring Alert Functions The central controller is operable to control the multicolor indicator and the speaker and microphone to provide the following functions.

1. Control the light color of the multicolor indicator (i.e., Red, green, yellow, flash, blink)
2. Control the Speaker to sound an alarm
3. Control the Speaker and microphone for voice communications Accessory Functions The central controller is operable to control the accessory functions to provide the following.

1. Vehicle Speed detection
2. Automatic toll payment detection
3. Temperature detection
4. Rain detection
5. Solar (day/night) detection
6. GPS position determination Communication Functions The central controller is operable to provide the following communication functions.

1. Wireless communication using Cellular, WiFi, Bluetooth
2. ONSTAR integration

3. Wired communications using LAN
4. Local remote control using IR remote

Miscellaneous Functions

The central controller is operable to provide the following miscellaneous functions.
1. Storing of sensor data and camera images
2. Access to store information by police
3. Communication with passing vehicles (automatic vehicle braking, warning indications, etc)

System Functions (Coordinated by Central Controller)

The central controller is operable to provide the following system functions.
1. Coordinate roadway lighting based on traffic patterns/weather
2. Coordinate roadway lighting to facilitate efficiency and/or power savings
3. Control multicolor indicators over local region to indicate alert conditions
4. Process images for traffic control and/or crime detection/prevention
5. Communicate with stranded motorist for emergency response The various aspects of this disclosure are provided to enable one of ordinary skill in the art to practice the present invention. Various modifications to aspects presented throughout this disclosure will be readily apparent to those skilled in the art, and the concepts disclosed herein may be extended to other applications. Thus, the claims are not intended to be limited to the various aspects of this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Accordingly, while aspects of a gimbaled LED array module have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. An LED mounting assembly for directing light emitted from an LED array, the LED mounting assembly comprising:
   a gimbaled assembly configured to receive the LED array and to allow for positioning the LED array to direct the light emitted from the LED array;
   a body portion configured to receive the gimbaled assembly;
   a connector configured to provide at least one of an electrical connection and a mechanical connection for the LED mounting assembly; and
   a mounting arm configured to couple the connector to the body portion.

2. The LED mounting assembly of claim 1, said connector configured to couple the LED mounting assembly to a light fixture.

3. The LED mounting assembly of claim 1, further comprising a radial heat sink configured to couple the LED array to the gimbaled assembly.

4. The LED mounting assembly of claim 3, the radial heat sink comprising a plurality of radially extending fins to dissipate heat generated by the LED array.

5. The LED mounting assembly of claim 3, further comprising an environmentally protective seal that seals the LED array to the radial heat sink.

6. The LED mounting assembly of claim 1, wherein the connector couples electrical signals to the LED array.

7. The LED mounting assembly of claim 6, further comprising a driver that receives the electrical signals and produces at least one drive signal that is coupled to the LED array.

8. The LED mounting assembly of claim 1, wherein the LED mounting assembly is mounted to a first T connector, wherein the first T-connector comprises a socket that mates with the connector to support the LED mounting assembly, and wherein the first T connector further comprises first and second ends that are each configured to mechanically and electrically couple the first T connector to at least one of a post and a second T connector.

9. An LED mounting assembly for directing light emitted from an LED array, the LED mounting assembly comprising:
   a gimbaled assembly configured to receive the LED array and to allow for positioning the LED array to direct the light emitted from the LED array, wherein the gimbaled assembly comprises an inner ring that is coupled to an outer ring by a first set of rotatable arms to allow the inner ring to rotate in a first direction;
   a body portion configured to receive the gimbaled assembly; and
   a connector coupled to the body portion, the connector configured to provide at least one of an electrical connection and a mechanical connection for the LED mounting assembly.

10. The LED mounting assembly of claim 9, further comprising a first locking mechanism configured to lock the inner ring at a selected position in the first direction.

11. The LED mounting assembly of claim 9, wherein the gimbaled assembly comprises a second set of rotatable arms that couple the LED array to the inner ring to allow the LED array to rotate in a second direction.

12. The LED mounting assembly of claim 11, further comprising a second locking mechanism configured to lock the LED array at a selected position in the second direction.

13. A lighting fixture for directing light emitted from an LED array, the lighting fixture comprising:
   a lamp head; and
   at least one LED mounting assembly coupled to the lamp head, the at least one LED mounting assembly comprising:
      a gimbaled assembly configured to receive the LED array and to allow for positioning the LED array to direct the light emitted from the LED array;
      a body portion configured to receive the gimbaled assembly;
      a connector configured to provide at least one of an electrical connection and a mechanical connection to the body portion; and
      a mounting arm configured to couple the connector to the body portion.

14. The lighting fixture of claim 13, further comprising a radial heat sink configured to couple the LED array to the gimbaled assembly.

15. The lighting fixture of claim 14, the radial heat sink comprising a plurality of radially extending fins to dissipate heat generated by the LED array.

16. The lighting fixture of claim 14, further comprising an environmentally protective seal that seals the LED array to the radial heat sink.

17. The lighting fixture of claim 13, wherein the connector couples electrical signals to the LED array.

18. The lighting fixture of claim 17, further comprising a driver that receives the electrical signals and produces at least one drive signal that is coupled to the LED array.

19. The lighting fixture of claim 13, further comprising a rotating mount coupled to the lamp head and configured to allow 360 degrees of rotation.

20. A lighting fixture for directing light emitted from an LED array, the lighting fixture comprising:
a lamp head; and
at least one LED mounting assembly coupled to the lamp head, the at least one LED mounting assembly comprising:
a gimbaled assembly configured to receive an LED array and to allow for positioning the LED array to direct the light emitted from the LED array, wherein the gimbaled assembly comprises an inner ring that is coupled to an outer ring by a first set of rotatable arms to allow the inner ring to rotate in a first direction;
a body portion configured to receive the gimbaled assembly; and
a connector coupled to the body portion, the connector configured to provide at least one of an electrical connection and a mechanical connection to the body portion.

21. The lighting fixture of claim 20, further comprising a first locking mechanism configured to lock the inner ring at a selected position in the first direction.

22. The lighting fixture of claim 20, wherein the gimbaled assembly comprises a second set of rotatable arms that couple the LED array to the inner ring to allow the LED array to rotate in a second direction.

23. The lighting fixture of claim 22, further comprising a second locking mechanism configured to lock the LED array at a selected position in the second direction.

24. A lighting fixture for directing light emitted from an LED array, the lighting fixture comprising:
a lamp head;
a controller coupled to the lamp head and configured to control the operations of the lighting fixture; and
at least one LED mounting assembly coupled to the lamp head, the at least one LED mounting assembly comprising:
a gimbaled assembly configured to receive an LED array and to allow for positioning the LED array to direct the light emitted from the LED array;
a body portion configured to receive the gimbaled assembly; and
a connector coupled to the body portion, the connector configured to provide at least one of an electrical connection and a mechanical connection to the body portion.

25. The lighting fixture of claim 24, further comprising a multicolored indicator coupled to the lamp head and configured to emit light having one or more colors in response to control signals from the controller.

26. The lighting fixture of claim 24, further comprising a speaker and microphone coupled to the lamp head and configured to broadcast sound information from the controller and receive sound information that is passed to the controller.

27. The lighting fixture of claim 24, further comprising accessory sensors coupled to the lamp head and comprising at least one of a daytime detector, automatic toll payment detector, and speed detector all configured to exchange detected information with the controller.

28. The lighting fixture of claim 24, further comprising an infrared sensor coupled to the lamp head and configured to pass detected infrared data to the controller.

29. The lighting fixture of claim 24, further comprising a GPS system coupled to the lamp head and configured to pass detected positioning information to the controller.

30. The lighting fixture of claim 24, further comprising an antenna coupled to the lamp head and configured to provide communications between the controller and a central control entity using wireless communications.

31. The lighting fixture of claim 24, further comprising a communication interface coupled to the lamp head and configured to provide wired LAN communications between the controller and a central control entity.

32. A lighting system for directing light emitted from a plurality of lighting fixtures, the lighting system comprising:
a central controller; and
a plurality of lighting fixtures in communication with the central controller, each lighting fixture comprising at least one LED mounting assembly comprising:
a gimbaled assembly configured to receive an LED array and to allow for positioning the LED array to direct light emitted from the LED array;
a body portion configured to receive the gimbaled assembly; and
a connector coupled to the body portion, the connector configured to provide at least one of an electrical connection and a mechanical connection to the body portion.

33. The lighting system of claim 32, wherein each LED mounting assembly comprises a radial heat sink configured to couple the LED array to the gimbaled assembly.

34. The lighting system of claim 33, the radial heat sink comprising a plurality of radially extending fins to dissipate heat generated by the LED array.

35. The lighting system of claim 34, further comprising an environmentally protective seal that seals the LED array to the radial heat sink.

36. The lighting system of claim 32, wherein the gimbaled assembly comprises an inner ring that is coupled to an outer ring by a first set of rotatable arms to allow the inner ring to rotate in a first direction.

37. The lighting system of claim 36, further comprising a first locking mechanism configured to lock the inner ring at a selected position in the first direction.

38. The lighting system of claim 37, wherein the gimbaled assembly comprises a second set of rotatable arms that couple the LED array to the inner ring to allow the LED array to rotate in a second direction.

39. The lighting system of claim 38, further comprising a second locking mechanism configured to lock the LED array at a selected position in the second direction.

40. The lighting system of claim 32, wherein the connector couples electrical signals to the LED array.

41. The lighting system of claim 40, further comprising a driver that receives the electrical signals and produces at least one drive signal that is coupled to the LED array.

42. The lighting system of claim 32, further comprising a rotating mount coupled to each lighting fixture, respectively, each rotating mount configured to allow each lighting fixture to rotate 360 degrees based on control signals from the central controller.

43. The lighting system of claim 32, further comprising a controller coupled to each lighting fixture, respectively, to control operations of each lighting fixture.

44. The lighting system of claim 32, further comprising a multicolored indicator coupled to each lighting fixture, respectively, to emit light having one or more colors in response to control signals from the central controller.

45. The lighting system of claim 32, further comprising a speaker and microphone coupled to each lighting fixture, respectively, to broadcast sound information from the central controller and receive sound information that is passed to the central controller.

46. The lighting system of claim 32, further comprising accessory sensors coupled to each lighting fixture, respectively, and comprising at least one of a daytime detector, automatic toll payment detector, and speed detector all configured to exchange detected information with the central controller.

47. The lighting system of claim 32, further comprising an infrared sensor coupled to each lighting fixture, respectively, and configured to pass detected infrared data to the central controller.

48. The lighting system of claim 32, further comprising a GPS system coupled to each lighting fixture, respectively, and configured to pass detected positioning information to the central controller.

49. The lighting system of claim 32, further comprising an antenna coupled to each lighting fixture, respectively, and configured to provide communications with the central controller using wireless communications.

50. The lighting system of claim 32, further comprising a communication interface coupled to each lighting fixture, respectively, and configured to provide wired LAN communications with the central controller.

* * * * *